United States Patent
Kashiwagi

(10) Patent No.: US 6,800,390 B2
(45) Date of Patent: Oct. 5, 2004

(54) FUEL CELL POWER PLANT

(75) Inventor: Naoto Kashiwagi, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 261 days.

(21) Appl. No.: 10/095,535

(22) Filed: Mar. 13, 2002

(65) Prior Publication Data

US 2002/0136942 A1 Sep. 26, 2002

(30) Foreign Application Priority Data

Mar. 23, 2001 (JP) ........................................ 2001-084943

(51) Int. Cl.$^7$ .............................................. H01M 8/04
(52) U.S. Cl. .......................................... 429/34; 429/22
(58) Field of Search .............................. 429/12, 17, 22, 429/34

(56) References Cited

U.S. PATENT DOCUMENTS

| | | | | |
|---|---|---|---|---|
| 3,982,961 A | * | 9/1976 | Grasso | 429/34 |
| 4,037,024 A | * | 7/1977 | Landau | 429/17 |
| 4,769,297 A | * | 9/1988 | Reiser et al. | 429/17 |
| 5,441,821 A | * | 8/1995 | Merritt et al. | 429/17 |
| 6,444,345 B2 | * | 9/2002 | Sang | 429/34 |
| 6,670,067 B2 | * | 12/2003 | Sato et al. | 429/34 |

FOREIGN PATENT DOCUMENTS

| | | | | |
|---|---|---|---|---|
| JP | 9-022714 | * | 1/1997 | H01M/8/04 |
| JP | 9-213353 | | 8/1997 | H01M/8/04 |
| JP | 10-223244 | | 8/1998 | H01M/8/04 |
| JP | 10-511497 | | 11/1998 | H01M/8/04 |

* cited by examiner

Primary Examiner—Stephen J. Kalafut
(74) Attorney, Agent, or Firm—McDermott Will & Emery LLP

(57) ABSTRACT

A hydrogen supply passage (12) supplies hydrogen to a fuel cell stack (1) of a fuel cell power plant. Anode effluent discharged from the fuel cell stack (1) is recirculated into the hydrogen supply passage (12) through a recirculation passage (5B). An ejector (6) provided in the hydrogen supply passage (12) exerts a suction force over the anode effluent in the recirculation passage (5B) depending on a flow velocity of hydrogen supply passage (12). The recirculation passage (5B) comprises a first branch (5C) communicating with the ejector (6) via a recirculation pump (11) and a second branch (5D) directly communicating with the ejector (6). When the suction force of the ejector (6) is not sufficient to promote the recirculation of the anode effluent, the recirculation pump (11) is operated to forcibly recirculate the anode effluent to the hydrogen supply passage (12).

5 Claims, 6 Drawing Sheets

FIG. 4A  HYDROGEN SUPPLY

FIG. 4B  RECIRCULATION PUMP 11

FIG. 4C  COMPRESSOR 4

FUEL CELL POWER PLANT

FIELD OF THE INVENTION

This invention relates to the recirculation of hydrogen containing anode effluent discharged from a fuel cell stack of a fuel cell power plant.

BACKGROUND OF THE INVENTION

Tokuhyo Hei 10-511497 published by the Japanese Patent Office in 1998 discloses a mechanism that recirculates hydrogen containing anode effluent discharged from an anode of a fuel cell stack, to a hydrogen supply passage that supplies hydrogen to the anode of the fuel cell stack. The mechanism comprises an ejector provided in the hydrogen supply passage and a recirculation passage connected thereto.

A hydrogen source supplies hydrogen to the anode via the hydrogen supply passage under a predetermined pressure. The ejector aspirates anode effluent in the recirculation passage into the hydrogen supply passage due to Venturi effect of the flow of hydrogen in the hydrogen supply passage.

SUMMARY OF THE INVENTION

The recirculation flowrate of the anode effluent therefore depends on the hydrogen flowrate in the hydrogen supply passage, and when the hydrogen flowrate is small, the ejector is not able to exert sufficient suction force over the anode effluent in the recirculation passage. If an ejector of smaller size is applied, it may be possible to aspirate anode effluent even when the hydrogen flowrate in the hydrogen supply passage is small. However, such a small ejector cannot pass the required amount of hydrogen when the fuel stack is in the full operation.

In other words, the ejector efficiently works only when the hydrogen flowrate in the hydrogen supply passage is within a predetermined flowrate range. A fuel cell power plant, when used for a vehicle drive system, is apt to suffer a large variation of loads depending on the vehicle running conditions, and the hydrogen flowrate in the hydrogen supply passage also varies largely. In such a fuel cell power plant, the anode effluent recirculation system using an ejector works only in limited conditions.

It is therefore an object of this invention to improve the performance of an anode effluent recirculation system using an ejector.

In order to achieve the above object, this invention provides a fuel cell power plant comprising a fuel cell stack that generates an electric power by a reaction of hydrogen and air, and discharges a hydrogen containing anode effluent, a hydrogen supply passage that supplies hydrogen to the fuel cell stack, a recirculation passage connected to the fuel cell stack to recirculate the anode effluent to the hydrogen supply passage, an ejector that promotes a recirculation of the anode effluent by exerting a suction force on the anode effluent in the recirculation passage depending on a flow velocity of hydrogen in the hydrogen supply passage, and a recirculation pump installed in the recirculation passage to pressurize the anode effluent.

The details as well as other features and advantages of this invention are set forth in the remainder of the specification and are shown in the accompanying drawings.

BRIEF DESCRIPTION OF THE DRAWINGS

FIGS. 4A–4C are timing charts describing an order of operations of an anode effluent recirculation system of the fuel cell power plant when the power plant starts up.

DESCRIPTION OF THE PREFERRED EMBODIMENTS

Figure 1:
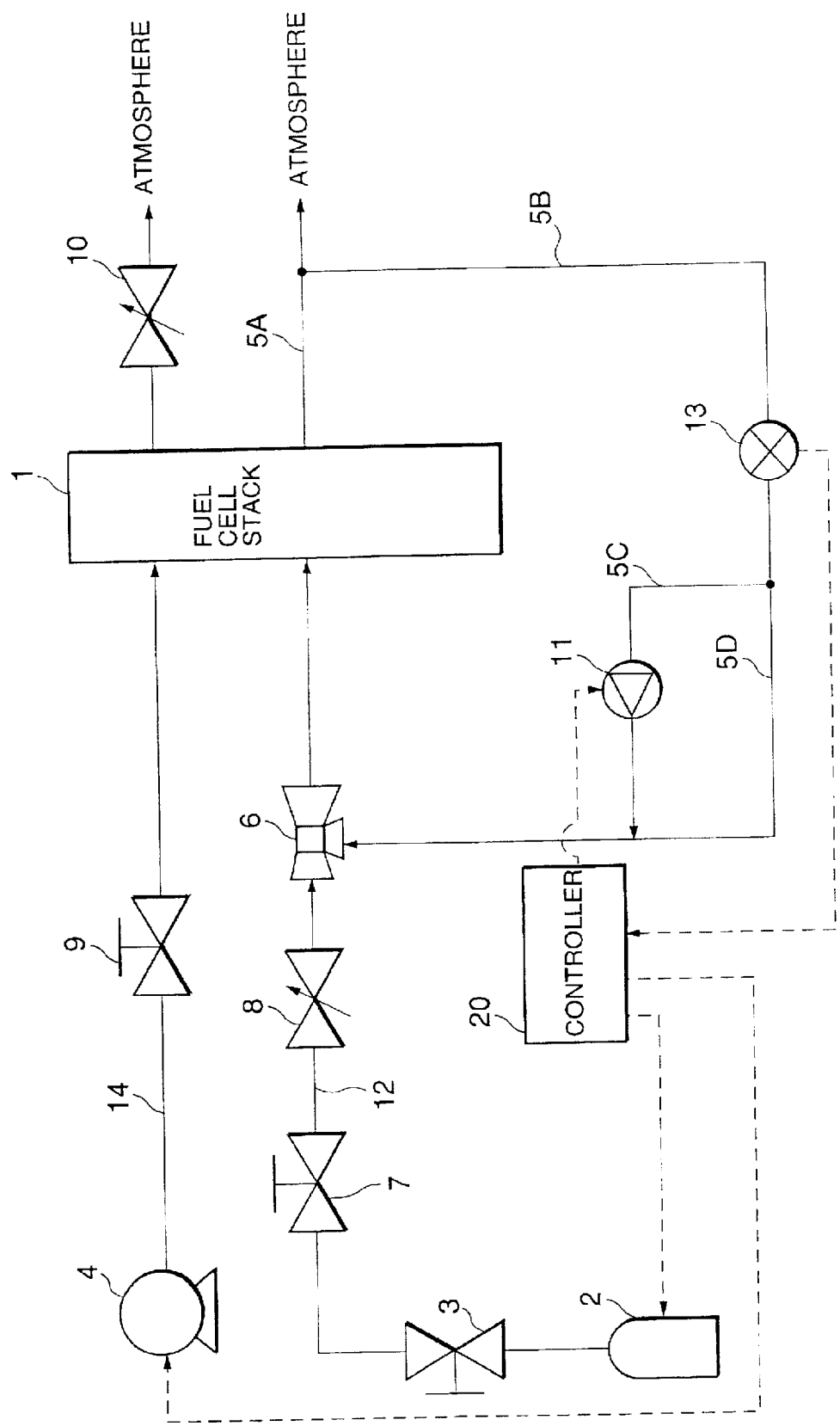
FIG. 1 is a schematic diagram of a fuel cell power plant according to this invention.

Referring to FIG. 1 of the drawings, a fuel cell stack 1 adapted for a vehicle drive system comprises stacked fuel cells that generate electric power through a reaction of hydrogen supplied to an anode and air supplied to a cathode.

Hydrogen is supplied to the anode from a high pressure hydrogen tank 2 via a hydrogen supply passage 12. A pressure reducing valve 3, shut-off valve 7, pressure control valve 8 and ejector 6 are installed in series in the hydrogen supply passage 12. Hydrogen in the high pressure hydrogen tank 2 first passes the pressure reducing valve 3 where the pressure of hydrogen is reduced to a predetermined range, and reaches the pressure control valve 8 via the shut-off valve 7. The pressure control valve 8 regulates the pressure of hydrogen to a predetermined pressure and supplied to the anode in the fuel cell stack 1 via the ejector 6.

The fuel cell stack 1 generates electric power by the reaction of hydrogen and air thus supplied, and discharges hydrogen containing anode effluent from the anode and oxygen containing cathode effluent from the cathode.

The cathode effluent is discharged into atmosphere via a pressure control valve 10.

The anode effluent is discharged into an exhaust passage 5A of which an end is open to atmosphere. The exhaust passage 5A branches off a recirculation passage 5B in order that a part of the anode effluent is recirculated into the hydrogen supply passage 12.

The recirculation passage 5B bifurcates into a first branch 5C and a second branch 5D. These branches 5C and 5D join to each other before the recirculation passage 5B is connected to the ejector 6.

The ejector 6 has a known construction and aspirates anode effluent from the recirculation passage 5B into the hydrogen supply passage 12 by a Venturi effect of hydrogen flow in the hydrogen supply passage 12. Anode effluent aspirated by the ejector 6 is mixed with hydrogen in the hydrogen supply passage 12 and then supplied again to the anode of the fuel cell stack 1. Suction force of the ejector 6 that is exerted on anode effluent in the recirculation passage 5B is larger as the hydrogen flowrate in the hydrogen supply passage 12 is larger.

Of the two branches 5C and 5B of the recirculation passage 5B, the first branch 5C is provided with a recirculation pump 11 that is driven by an electric motor. The operation of the recirculation pump 11 is controlled by a signal input from a programmable controller 20. The operation of the compressor 4, control of the hydrogen supply amount of the high pressure hydrogen tank 2 are also controlled by respective signals input from the controller 20.

In relation with the control of the recirculation pump 11, a flowrate sensor 13 is disposed in the recirculation passage 5B upstream of the bifurcation of the branches 5C and 5B. The flowrate sensor 13 detects a flowrate Q of anode effluent in the recirculation passage 5B and inputs a corresponding signal into the controller 20.

The controller 20 comprises a microcomputer provided with a central processing unit (CPU), a read only memory (ROM), a random access memory (RAM) and an input/output interface (I/O interface). The controller may comprise a plurality of such microcomputers.

The controller 20 controls the operation of recirculation pump 11 and compressor 4 and the hydrogen supply amount of the high pressure hydrogen tank 12 in a different way depending on the determination as to whether or not start-up operation of the power plant has been completed.

Figure 5:
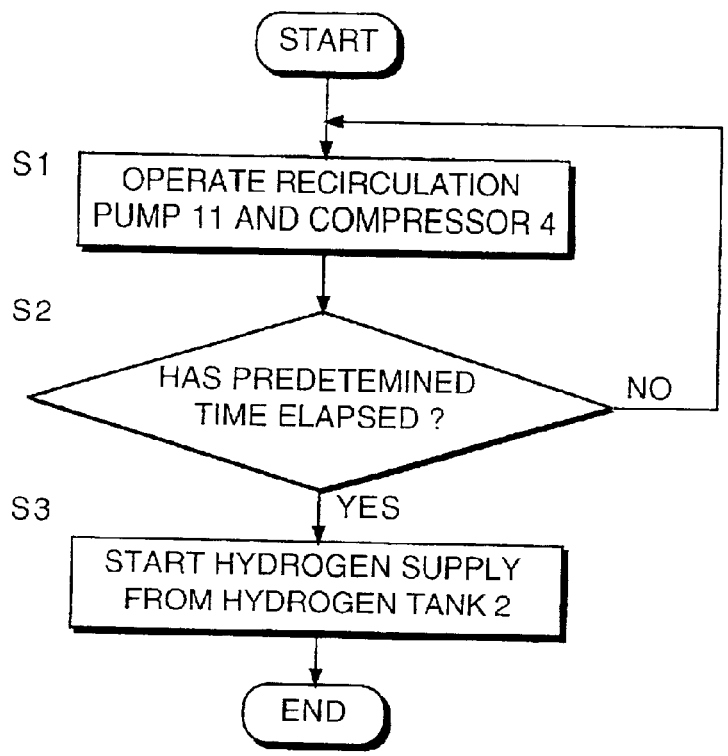
FIG. 5 is a flowchart describing a start-up routine of the fuel cell power plant performed by a controller according to this invention.

Referring to FIG. 5, a start-up routine of the fuel cell system will be described. The controller 20 performs this routine only once when the power plant starts to operate.

The controller 20 first operates the recirculation pump 11 and the compressor 4 in a step S1.

In a next step S2, the controller 20 determines if an elapsed time after the operation start of the recirculation pump 11 and the compressor 4 has reached a predetermined value. If the elapsed time is less than the predetermined value, the controller repeats the processing of the step S1 until the elapsed time reaches the predetermined time.

When on the other hand, the elapsed time has reached the predetermined the step S2, the routine proceeds to a step S3 and the controller 20 opens pressure hydrogen tank 2 to start supplying hydrogen.

After the processing of the step S3, the controller 20 terminates the routine.

Referring now to FIGS. 4A–4C, the high pressure hydrogen tank 2 is closed and the recirculation pump 11 and the compressor 4 are at rest, when the start-up operation of the power plant has not yet proceeded.

At a time t1 when the start-up operation of the power plant is commanded, the controller 20 first starts the operation of the recirculation pump 11 and the compressor 4. As a result, air is supplied to the cathode of the fuel cell stack 1 and air or residual gas are circulated through the recirculation passage 5B and the hydrogen supply passage 12 via the anode of the fuel cell stack 1 due to the operation of the recirculation pump 11.

At a time t2 when the predetermined time has elapsed, the controller 20 opens the high pressure hydrogen tank 2 to start hydrogen supply. At this moment, a gas flow from the recirculation passage 5B to the fuel cell stack 1 via the ejector 6 has been formed due to the above operation of the recirculation pump 11. Hydrogen supplied to the hydrogen supply passage 12 from the high pressure hydrogen tank 2 therefore joins to this gas flow at the ejector 6 and supplied together to the anode of the fuel cell stack 1. By forming a gas flow through the ejector 6 prior to start of the hydrogen supply brings the following effect.

If the hydrogen supply is started in the state where there is no gas flow in the ejector 6, a part of the pressurized hydrogen from the high pressure hydrogen tank 2 flows into the recirculation passage 5B via the ejector 6. Since the recirculation passage 5B is communicated with atmosphere via the exhaust passage 5A, a part of hydrogen may be lost due to this operation.

By previously forming a gas flow that prevents hydrogen from flowing into the recirculation passage 5B from the ejector 6, the whole amount of hydrogen supplied from the high pressure hydrogen tank 2 is supplied to the anode of the fuel cell stack 1.

Next, referring to FIG. 6, a recirculation control routine of anode effluent performed by the controller 20 will be described. This routine is performed at an interval of ten milliseconds after the termination of the start-up routine until the power plant stops its operation.

First, in a step S11, the controller 20 compares the flowrate Q of anode effluent in the recirculation passage 5B with a predetermined flowrate Qc. On this occasion, the start-up routine has terminated, and a flow of hydrogen has been formed in the hydrogen supply passage 12 from the ejector 6 to the fuel cell stack 1.

Figure 2:
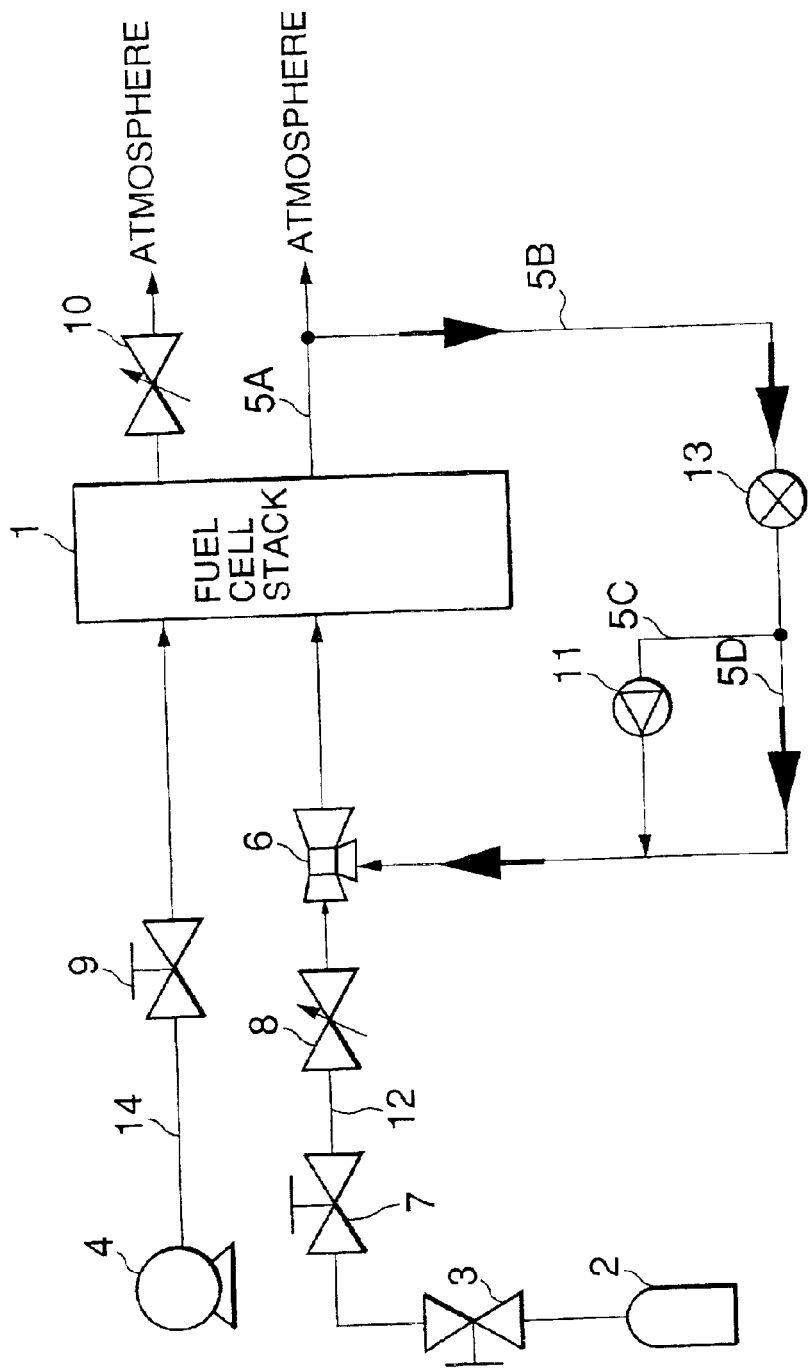
FIG. 2 is a schematic diagram of the fuel cell power plant showing a flow of anode effluent when a recirculation pump according to this invention is not operated.
Figure 3:
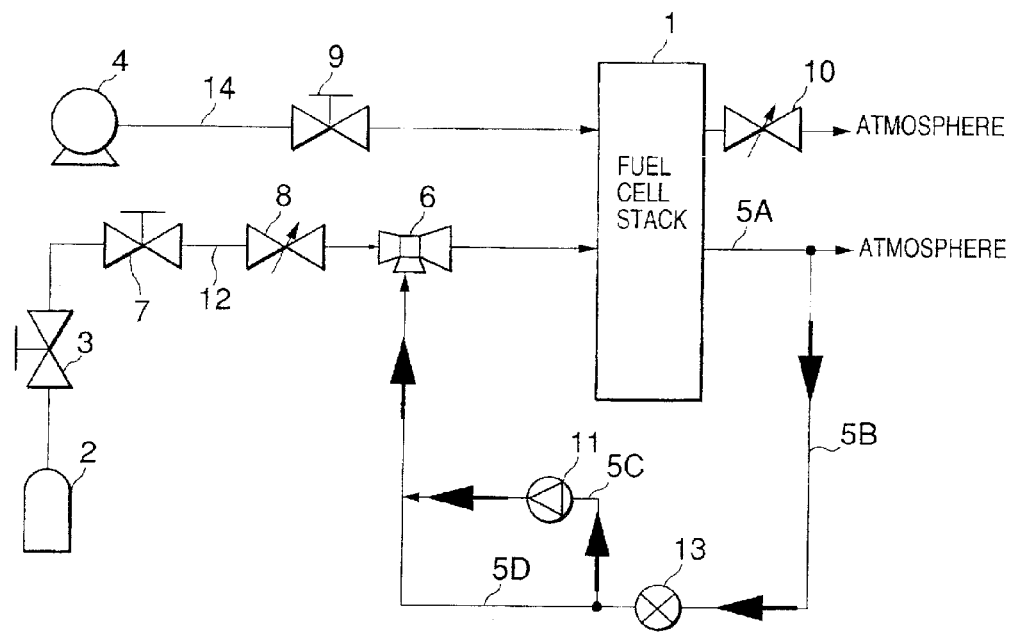
FIG. 3 is similar to FIG. 2, but showing a flow of anode effluent when the recirculation pump operates.

The predetermined flowrate Qc is set for example equal to ten percent of the maximum flowrate in the recirculation passage 5B. The preferable value of the predetermined flowrate Qc depends on the specifications of the recirculation pump 11 as well as the ejector 6. In general, however, it is preferable that, when the fuel cell stack is generating power for driving the vehicle, the anode effluent is recirculated only by the suction force of the ejector 6, as shown in FIG. 2, and that it is forcibly recirculated by the recirculation pump 11, as shown in FIG. 3, when the fuel cell stack 1 is not generating power for driving the vehicle, i.e., when the vehicle is coasting or at rest. It is preferable that the specifications of the ejector 6 and recirculation pump 11 are preferably determined based on the above concept and the predetermined flowrate Qc is set accordingly.

Now, when the flowrate Q of anode effluent is larger than the predetermined flowrate Qc, in a step S12, the controller stops the operation of the recirculation pump 11 or maintains the non-operation state of the same. After the processing of the step S12, the controller terminates the routine.

In this sate, the ejector 6 exerts sufficient suction force to anode effluent in the recirculation passage 5B, so no pumping is required to recirculate anode effluent into the hydrogen flow in the hydrogen supply passage 12.

When on the other hand, the flowrate Q is not larger than the predetermined flowrate Qc, in a step S13, the controller 20 operates the recirculation pump 11 or maintains the operation of the same. As a result, anode effluent discharged from the fuel cell stack 1 to the exhaust passage 5A is forcibly recirculated into the hydrogen supply passage 12 via the recirculation passage 5B through the branch 5C by the recirculation pump 11.

When the flowrate of hydrogen in the hydrogen supply passage 12 is small, the ejector 6 cannot aspirate anode effluent sufficiently, but by pressurizing anode effluent by the recirculation pump 11, anode effluent is forcibly recirculated into the hydrogen supply passage 12. Anode effluent discharged from the fuel cell stack 1 contains a considerable amount of hydrogen and it is wasted if anode effluent is discharged into the atmosphere. By forcibly recirculating anode effluent by the use of the recirculation pump 11 when the ejector 6 cannot act in the way it should, the waste of hydrogen is minimized.

The above control therefore enhances the recycling of anode effluent discharged from the fuel cell stack 1.

If a variable capacity pump is used for the recirculation pump 11, an abrupt variation in the recirculation flowrate of anode effluent accompanying the operation stop and restart of the recirculation pump 11 can be suppressed.

Next, referring to FIGS. 7 and 8, a second embodiment of this invention will be described.

Figure 7:
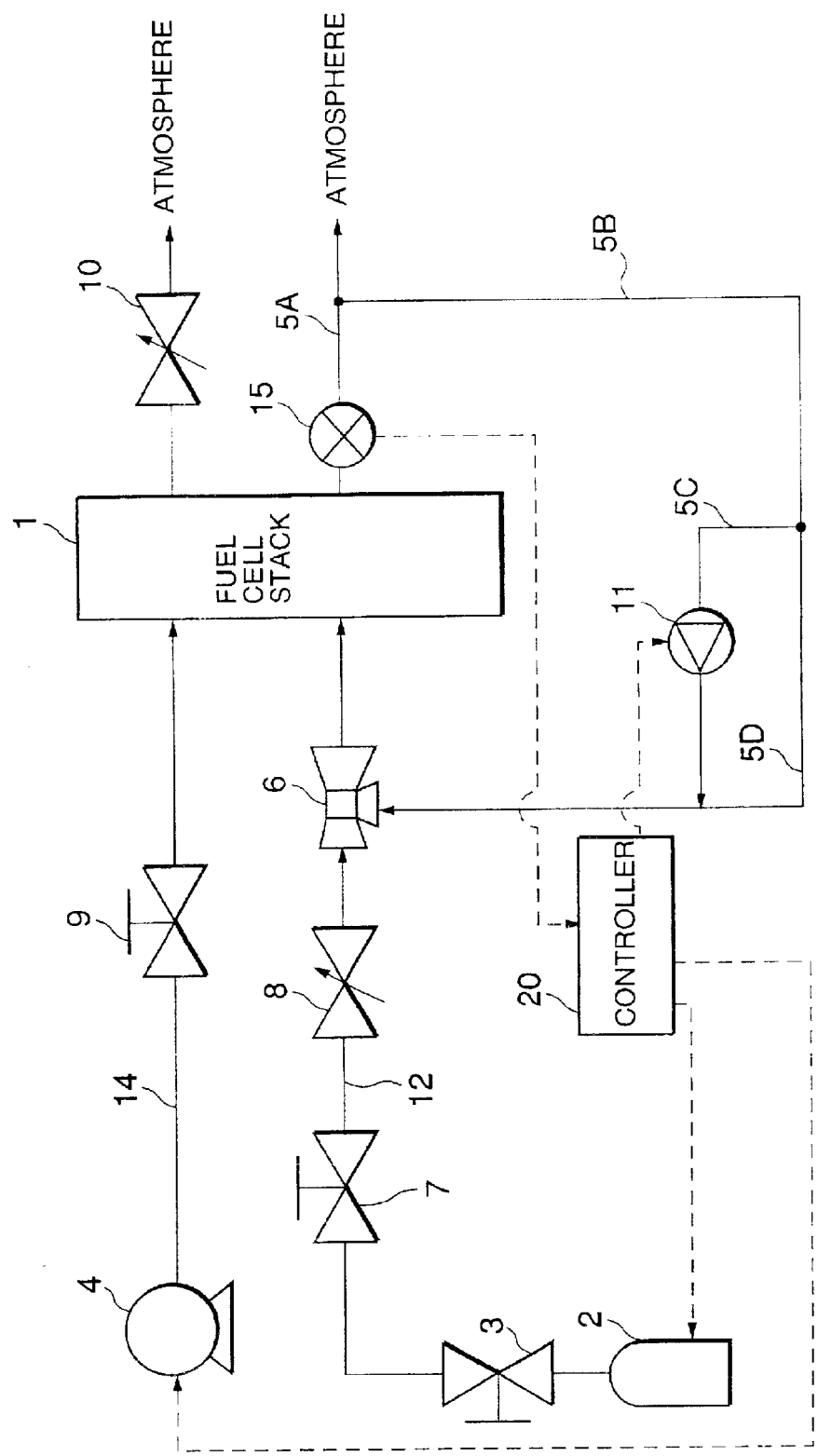
FIG. 7 is similar to FIG. 1, but showing a second embodiment of this invention.

Referring to FIG. 7, the power plant according to this embodiment is provided with a flowrate sensor 15 in the exhaust passage 5A instead of the flowrate sensor 13 of the first embodiment. The other parts of the hardware of the power plant are identical to that of the first embodiment.

When the fuel cell stack 1 is not generating power for driving the vehicle, the load on the fuel cell stack 1 is small and the supply amount of hydrogen to the fuel cell stack 1 as well as the discharge amount of anode effluent from the fuel cell stack 1 are also small. Accordingly, the ejector 6 does not promote recirculation of anode effluent.

This embodiment operates the recirculation pump 11 when the discharge flowrate Qa of anode effluent is not larger than a predetermined flowrate Qz to forcibly recirculate anode effluent discharged from the fuel cell stack 1 into the hydrogen supply passage 12.

Figure 6:
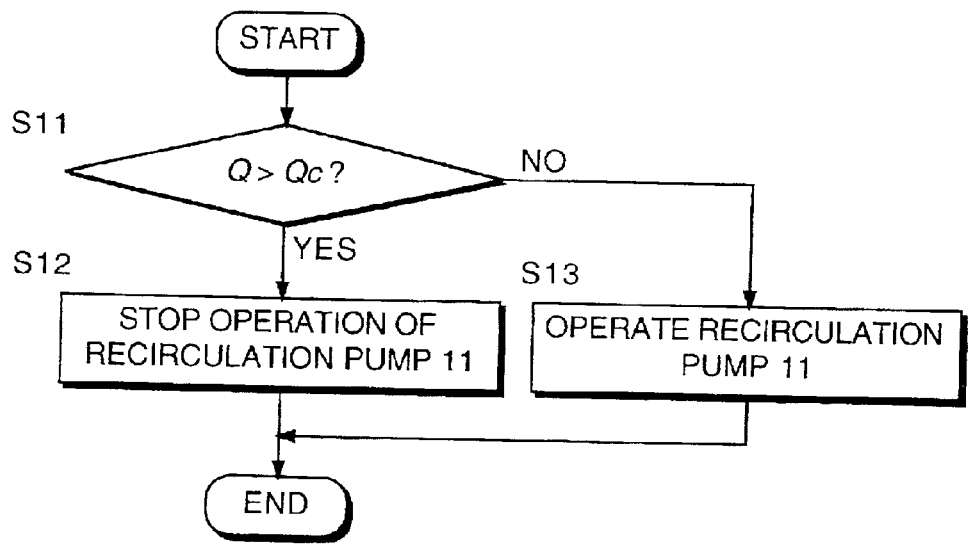
FIG. 6 is a flowchart describing a recirculation control routine of anode effluent performed by the controller.
Figure 8:
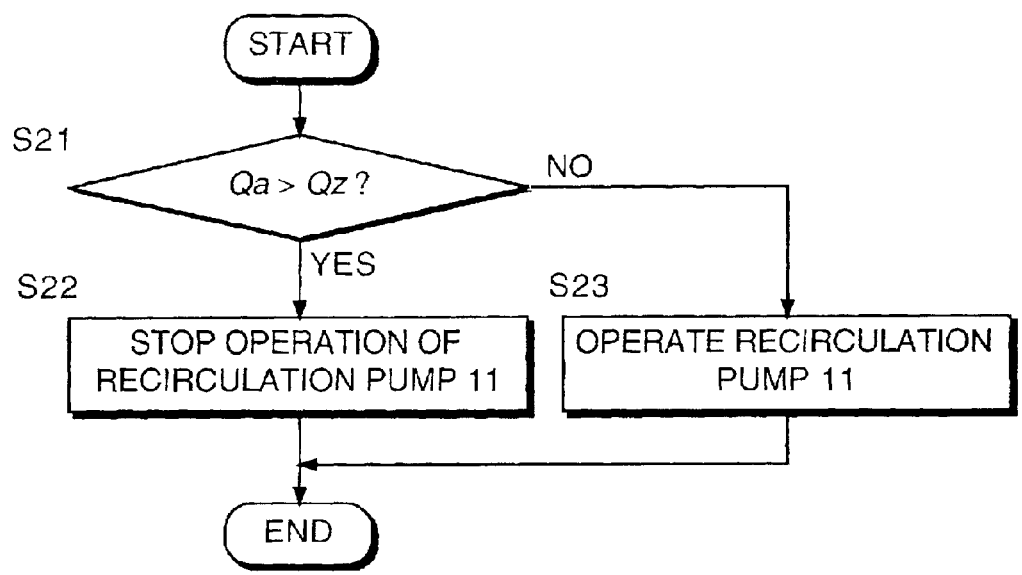
FIG. 8 is similar to FIG. 6, but showing the second embodiment of this invention.

In order to realize this control, the controller 20 performs a routing shown in FIG. 8 that is similar to that of FIG. 6 of the first embodiment. This routine is also performed at an interval of ten milliseconds after the termination of the start-up routine of FIG. 5.

The routine of FIG. 8 comprises a step S21 where the flowrate Q and the predetermined flowrate Qc of the step S11 of the routine of FIG. 6 are respectively replaced by the flowrate Qa and the predetermined flowrate Qz. The predetermined flowrate Qz is set for example at a value corresponding to ten percent of the maximum discharge flowrate of anode effluent from the fuel cell stack 1.

The processing of a step S22 is identical to that of the step S11 of FIG. 6 and the processing of a step S23 is identical to that of the step S13 of the same.

According also to this embodiment, the recycling efficiency of anode effluent of the fuel cell stack 1 is improved as in the case of the first embodiment.

The contents of Tokugan 2001-84943, with a filing date of Mar. 23, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A fuel cell power plant comprising:
   a fuel cell stack that generates an electric power by a reaction of hydrogen and air, and discharges a hydrogen containing anode effluent;
   a hydrogen supply passage that supplies hydrogen to the fuel cell stack;
   a recirculation passage connected to the fuel cell stack to recirculate the anode effluent to the hydrogen supply passage;
   an ejector that promotes a recirculation of the anode effluent by exerting a suction force on the anode effluent in the recirculation passage depending on a flow velocity of hydrogen in the hydrogen supply passage; and
   a recirculation pump installed in the recirculation passage to pressurize the anode effluent.

2. The fuel cell power plant as defined in claim 1, wherein the recirculation passage comprises a first branch communicating with the ejector via the recirculation pump and a second branch communicating directly with the ejector.

3. The fuel cell power plant as defined in claim 2, wherein the first branch and the second branch are connected to the ejector after the first branch and the second branch join to each other.

4. The fuel cell power plant as defined in claim 1, wherein the power plant further comprises a flowrate sensor that detects a flowrate of the anode effluent in the recirculation passage and a programmable controller programmed to operate the recirculation pump when the flowrate of the anode effluent in the recirculation passage is not larger than a predetermined flowrate and stop operation of the recirculation pump when the flowrate of the anode effluent in the recirculation passage is larger than the predetermined flowrate.

5. The fuel cell power plant as defined in claim 1, wherein the power plant further comprises a flowrate sensor that detects a flowrate of the anode effluent discharged from the fuel cell stack and a programmable controller programmed to operate the recirculation pump when the flowrate of the anode effluent discharged from the fuel cell stack is not larger than a predetermined flowrate and stop operation of the recirculation pump when the flowrate of the anode effluent discharged from the fuel cell stack is larger than the predetermined flowrate.

* * * * *